(12) United States Patent
Waters

(10) Patent No.: US 6,612,695 B2
(45) Date of Patent: Sep. 2, 2003

(54) LIGHTED READING GLASSES

(76) Inventor: Michael Waters, 372 Bateman Cir. N., Barrington Hills, IL (US) 60010

( * ) Notice: Subject to any disclaimer, the term of this patent is extended or adjusted under 35 U.S.C. 154(b) by 0 days.

(21) Appl. No.: 10/006,919

(22) Filed: Nov. 7, 2001

(65) Prior Publication Data

US 2003/0086053 A1 May 8, 2003

(51) Int. Cl.[7] ................................................. G02C 1/00
(52) U.S. Cl. ....................................... 351/158; 362/105
(58) Field of Search ................................ 351/158, 121, 351/111, 41; 362/105

(56) References Cited

U.S. PATENT DOCUMENTS

| | | |
|---|---|---|
| 1,255,265 A | 2/1918 | Zachara |
| 2,638,532 A | 5/1953 | Brady |
| 2,904,670 A | 9/1959 | Calmes |
| 3,060,308 A | 10/1962 | Fortuna |
| 3,350,552 A | 10/1967 | Lawrence |
| 3,769,663 A * | 11/1973 | Perl .............................. 24/3.3 |
| 4,283,127 A | 8/1981 | Rosenwinkel et al. |
| 4,959,760 A | 9/1990 | Wu |
| 5,218,385 A | 6/1993 | Lii |
| 5,230,558 A | 7/1993 | Jong |
| D349,123 S | 7/1994 | Cooley et al. |
| 5,331,357 A | 7/1994 | Cooley et al. |
| 5,541,767 A | 7/1996 | Murphy et al. |
| 5,722,762 A | 3/1998 | Soll |
| 5,741,060 A | 4/1998 | Johnson |
| 5,946,071 A | 8/1999 | Feldman |
| 5,997,165 A | 12/1999 | Lehrer |
| 6,012,827 A | 1/2000 | Caplan et al. |
| D428,431 S | 7/2000 | Jordan |

* cited by examiner

*Primary Examiner*—Hung Xuan Dang
(74) *Attorney, Agent, or Firm*—Fitch, Even, Tabin & Flannery

(57) ABSTRACT

Lighted reading glasses are provided to enable clear reading of normal sized text to occur when the reading material is held at usual distances from the reader in dimly lit or dark locations. The lighted glasses have high intensity lights, such as in the form of LEDs that generate narrow light beam cones and which are oriented via light mounts as by inward canting of the light beam cones to meet and overlap so high brightness light is generated in a conical overlap area of light which is maximized in size in the range of normal reading distances. The light mounts include housings that are very compactly sized via the use of small coin cell batteries for powering the LEDs they hold. The housings are tapered from their maximum width sized to be slightly larger than the diameter of the disc-shaped cell batteries to either end thereof along their length, and have a depth sized to accommodate two of the stacked very thin, e.g., one-eighth of an inch each, coin cell batteries. In this manner, a very small and compact light module is provided that, while especially well-suited for reading glasses due to the preferred inward cant provided by light mounting surfaces of the housing to tailor the location of the overlap lighted area to the reading area, can also be used with other types of head gear, such as caps or other types of hats.

16 Claims, 6 Drawing Sheets

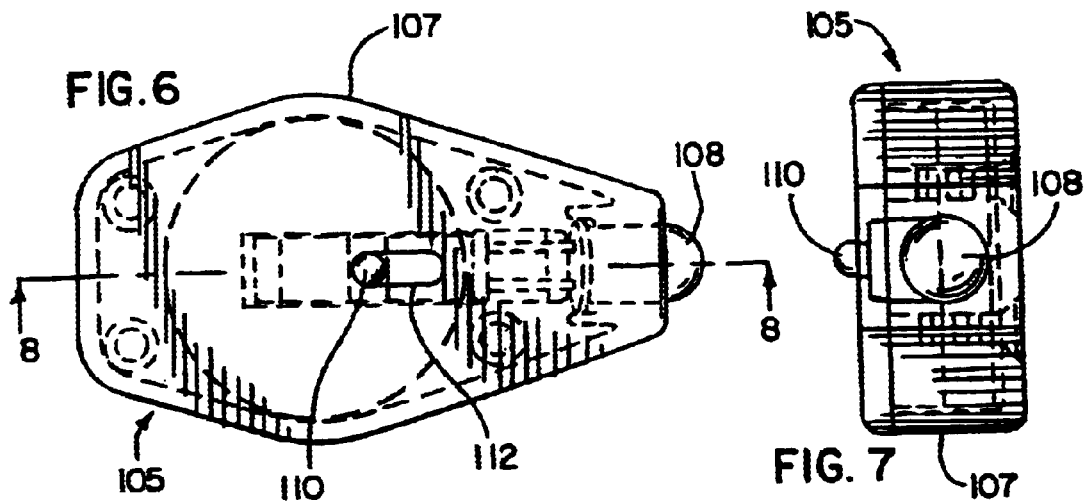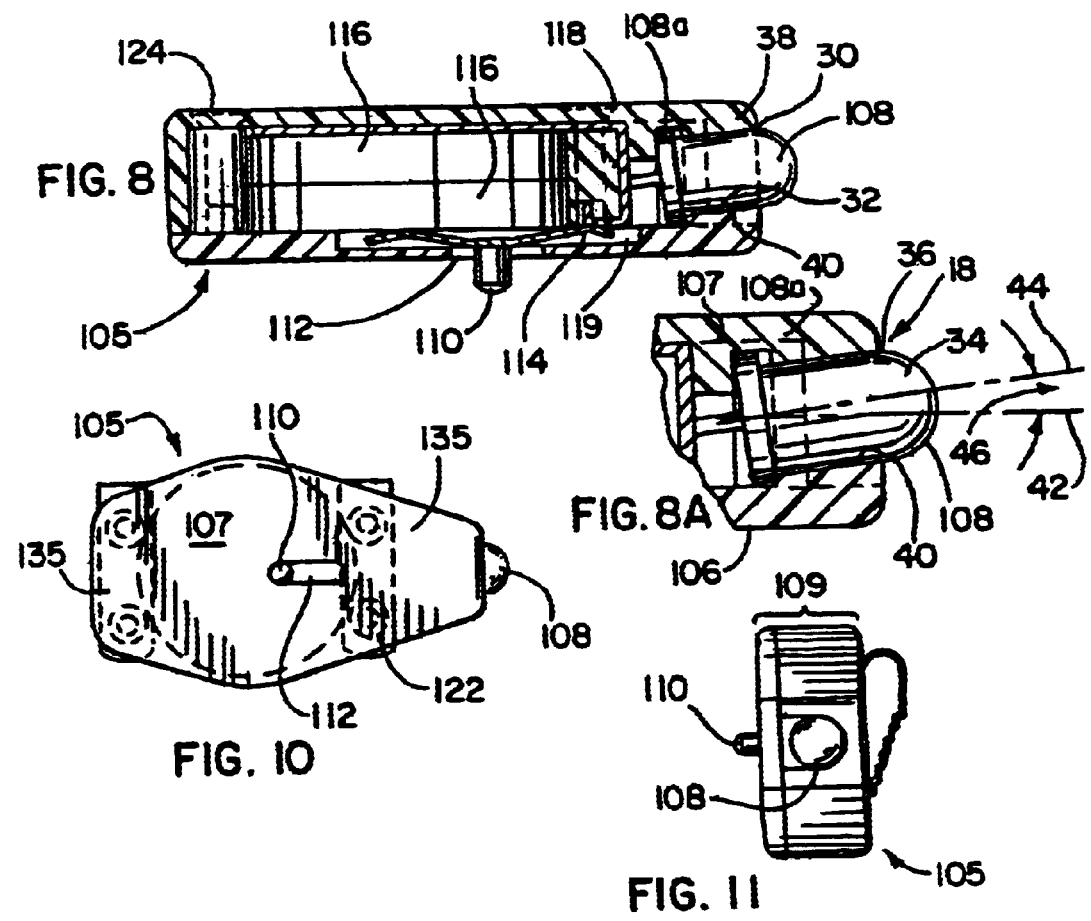

LIGHTED READING GLASSES

FIELD OF THE INVENTION

The present invention relates generally to lighted glasses and, more particularly, to eyeglasses that are especially well-suited for reading in poorly lit areas.

BACKGROUND

The use of lights and other illuminating devices with glasses is known. Generally, however, they have not been very well adapted for use with reading glasses. As is known, these types of glasses typically are not worn all the time, and are subject to being frequently taken off and put back on. On the other hand, when reading glasses are worn, they should be comfortable enough to encourage their use so that people are not avoiding their glasses and instead straining their eyes to read.

Incandescent light bulbs commonly have been proposed for use with lighted glasses. Unfortunately, such lighting devices generate a significant amount of heat. Smaller, less powerful incandescent lights still may make the wearer feel quite uncomfortable after even a short while due to the proximity of the light source and the wearer's face. Further decreasing the size of the incandescent lights, to the point where the wearer is comfortable, may cause light output to be very dim and therefore unusable for illuminating reading material that are held at distances optimal for reading.

For example, if reading distance after using corrective lenses for those in need of vision correction of ordinary size text, e.g. 10 or 12 point font, is optimally ten to eighteen inches from the eyes, a light that is capable of brightly illuminating the pages within that range of distances is necessary for ensuring comfort in reading in dimly lighted areas. However, a lower intensity light bulb, which may be preferable to reduce heat or increase battery life, may result in less than optimal lighting at the optimal reading distance, causing eye-strain and discomfort. In other words, the lower intensity of the light source will result in a decrease in the brightness of the light on the page so that the text to be read is only dimly lit.

The use fiber optic lighting devices instead of incandescent light bulbs is known. In such devices, optical fibers are bundled together to create a light producing device. The nature of fiber optics is such that there is no heat generated at the point where the light is typically transmitted; that is, adjacent the user's temple. Unfortunately, such devices suffer from a rather major limitation. Namely, a very intense and powerful light source must be available to provide light to the optical fibers. As such, head gear such as worn by surgeons having a fiber optic lighting device must at all times stay tethered to a fiber optic light source, which severely restricts the mobility of the user and thus the ease of use of the headgear. A portable light source that stays connected to the fiber optic light head via electrical cables is less than desirable in terms of the need to be able to conveniently carry the light source, and the inconveniences associated with dangling connecting lines.

An additional problem that exists with fiber optic devices, as well as incandescent lighting devices, is rapid battery consumption. Incandescent light bulbs are known to consume large amounts of power. Similarly, a fiber optic device, since it requires a strong lighting source, also requires a large amount of power. As a result, the user is be forced to change batteries often or stay tethered to a constant power source or light source.

Another disadvantage in prior art lighting devices is the manner in which surfaces are illuminated. Lighting devices used in the medical field generally produce a single fixed narrow beam of light to brightly illuminate the particular stationary body area on which the doctor may be operating. However, such a single narrow beam would not be particularly helpful in reading textual material as the beam would have to be continually shifted across the page being read. On the other hand, lights used with glasses generally tend to be very inefficient in their use of the light they generate as large amounts of light are cast beyond the field of view of the glasses. Adjustable lights are less than desirable as they require a user to make sure the lights are properly positioned each time the glasses are used.

Accordingly, there is a need for lighted glasses that are optimized for use in poorly lit or dim areas. More particularly, reading glasses having lights that are arranged to direct an optimum amount of light to the area where it is required most, i.e. the reading area, is needed. Further, lights that are very compact and lightweight, while still providing the necessary lighting strength and having a sufficiently long life for the power source that power these lights would be desirable.

SUMMARY OF THE INVENTION

In accordance with the present invention, lighted glasses, and preferably those adapted for reading which include corrective lenses, e.g. magnifiers, are provided to enable conventional sized text to be clearly read in dimly lit areas when held at a normal range of reading distances at which a user typically reads such material, such as between ten inches and eighteen inches from the lenses. High strength lights and light mounts therefor cooperate to light the reading area with a maximum amount of light provided in the reading distance range. More particularly, highly efficient and high intensity light emitting diodes (LEDs) are mounted in housings configured to fix narrow beams of light to be directed slightly inward toward each other so that the beams overlap in the reading distance range thus providing double the amount of light for reading over that provided by a single one of the lights. To this end, the housings are attached adjacent outer portions of the lenses so that the inwardly directed light beams light up the areas generally in front of the glasses, i.e. in its field of view, and which begins spaced forwardly therefrom, i.e. generally coinciding with the start of the reading distance range. Further, the small size and efficient nature of the preferred solid-state material, i.e. InGaN (indium gallium nitride), for the LEDs, allows very small power supplies to be used such as disc-shaped coin cell batteries for powering the LEDs which, in turn, allows both the light source and power source herein to be self-contained in a highly compact housing therefor. In this regard, the present invention also contemplates the provision of compactly sized lighting modules as described above that can be attached to reading or other glasses either removably or fixed in a more permanent fashion as described hereinafter, or to other items typically worn as headgear such as hats or the like.

The beams of light from the LEDs generate conical-shaped lighted areas such that upon intersection they cooperate to form a conical overlapping lighted area in which the brightness of the light is effectively doubled over that provided by a single LED. The conical overlapping lighted area increases in size as distances increase from the lenses. As is known, light tends to dissipate the further it is from its source. The overlapping conical lighted area is such that the peripheral areas in the field of view of the lenses that do not receive the double light strength of the overlapping light beams are closest to the lenses where light dissipation has its least effect in the reading distance range, whereas the overlapping lighted area increases in size further from the lenses with a corresponding decrease in the single light strength peripheral areas on either side of the cone of overlapping light. Thus, as light dissipates and distances increase from the lenses, the lighting provided will not suffer as the double light strength of the overlapping conical region of light will more than make up for the effects of light dissipation in the reading distance range.

To achieve the optimum amount of light flooding in the reading area, the light housings have surfaces configured to orient the central axis of the conical light beams in a direction that is canted slightly inward with the beams directed toward each other. The preferred canting of the narrow light beams which in the preferred and illustrated form are cones forming angles of twenty degrees is such that the cone axis has a fifteen degree angle with a reference line extending straight forwardly from the lenses. The lenses are preferably magnifiers of a predetermined diopter rating selected by a user so that conventionally sized text such as ten or twelve point font can be clearly read at distances ranging from between approximately ten and eighteen inches forwardly of the user. And it is in this distance range where the overlapping cone of light is formed by the conical light beams canted inward toward each other, as described. In this way, the present lighted reading glasses are provided with lights whose light beams are directed in a carefully coordinated manner with the vision correction provided by the corrective reading lenses so that the amount of light is maximized where it is needed most, i.e. in the field of view of the lenses and within the range of distances at which conventional sized printed text is most commonly read.

In a preferred form, the glasses include temple arms that extend rearwardly from the outer portions of the lenses with the housings attached to the arms toward the forward ends thereof. The temple arms can be opened for use or folded when not in use. With the temple arms opened, the housings are each oriented to project light therefrom forwardly inwardly and toward the light emanating from the housing attached on the other arm. The temple arms toward their forward ends typically will extend substantially straight rearwardly generally normal to the lens frame portions so that the longitudinal axis of the housing is likewise in a normal orientation to the lens frame with the mounting surfaces of the housing configured to be canted inwardly therefrom to direct the light beams as earlier described. Should the configuration of the temple arms and/or housings vary from that described herein, the mounting surfaces can be configured to adapt accordingly such that the light beams are inwardly directed as desired.

The preferred LEDs herein are a small lightweight device that provide a very bright light, while consuming very little power. As such, the batteries enclosed in the housing are small and do not need to be changed as frequently as devices that utilize incandescent lights or fiber optics, which require large batteries. The LEDs provide a relatively narrow beam of light that can be well focused in a particular direction. For example, if two light modules are mounted on a pair of glasses, the LEDs in each module are positioned such that the cones of light produced by the LEDs in the light modules begin intersecting at a point closely adjacent to or coinciding with the start of the range of ideal reading distances. As such, the illuminated reading portion receives the brightest light possible since the intersection of both cones of light are trained on that area. Another advantage of using the high intensity LEDs is that because they consume such a small amount of power, virtually no heat is dissipated. Therefore, a user is able to wear eyeglasses having the light modules mounted thereon, for longer periods of time without suffering from heat and without being bothered by the weight of the devices.

In another form, the light modules are provided with spring clips that are attached to the light module housing. The spring clips are preferably a resilient material such as metal or sturdy plastic. The spring clips enable the light module to be removably attached to any pair of eyeglasses. In still another form of the invention, the light modules are fixedly mounted on clip-on glasses. In particular, the light modules are mounted in the temple area of the clip-on glasses to enable the LEDs in the light modules to project light in the manner described above.

BRIEF DESCRIPTION OF THE DRAWINGS

FIG. 6 is a side elevational view of the light module showing the coin cells in phantom and the tapered configuration of the housing from the widest diameter to hold the coin cells therein;

FIG. 7 is a front elevational view of the light module showing the thin configuration of the housing;

FIG. 8 is a cross-sectional view taken along line 8—8 of FIG. 6 showing light mounting surfaces for orienting the LED to project light at an oblique angle to a longitudinal axis of the housing;

FIG. 8A is an enlarged fragmentary view of the forward portion of the module to show more clearly the preferred angle at which the LEDs are mounted in the housing;

FIG. 10 is a side elevational view of the light module having spring-clips for being removable attached to the glasses;

FIG. 11 is a front elevational view of the light module of FIG. 10 showing a ridged surface on a resilient arm of one of the clips;

DETAILED DESCRIPTION OF THE PREFERRED EMBODIMENTS

Figure 1:
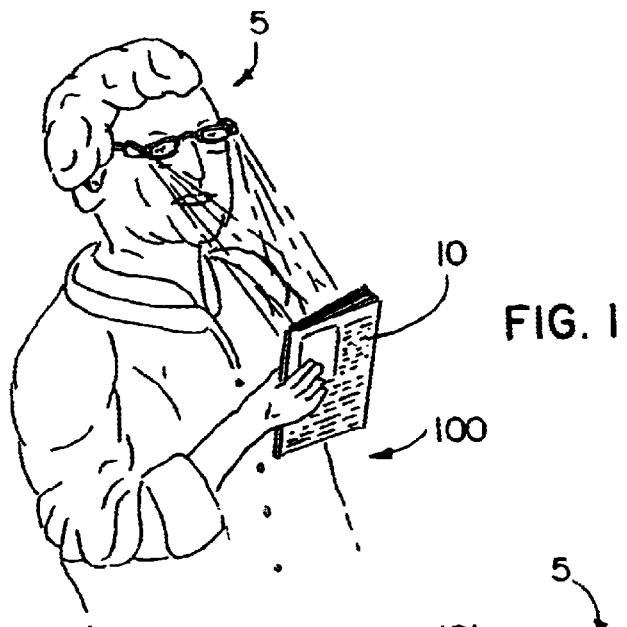
FIG. 1 is a perspective view of lighted reading glasses in accordance with the present invention showing the glasses used to read material held at a normal reading distance range.
Figure 2:
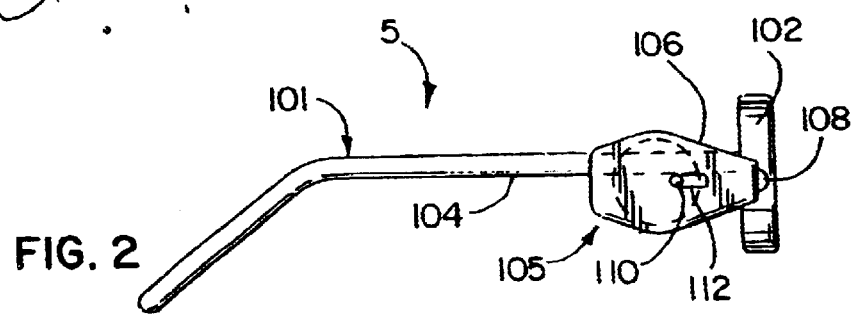
FIG. 2 is a side elevational view of the reading glasses of FIG. 1 showing a lighting module attached to a forward end portion of one of the temple arms of the glasses.

As shown in drawings for purposes of illustration, the invention is embodied in lighted reading glasses 5 which enable a user wearing the glasses 5 as shown in FIG. 1 to clearly read conventionally sized printed text 10, e.g. ten or twelve point font, held in a range of distances suitable for reading such text sizes where the reading is occurring in poorly or dimly lit areas. In this regard, the present lighted reading glasses 5 are ideally suited for use in areas that normally require a user to turn on a light before reading can occur but where doing so is less than desirable, such as in-a car or when reading in bed with another present who is trying to sleep while you read.

The lighted glasses 5 which as stated above are preferably reading glasses 5 will include lenses 12 of light transmissive material configured to refract light to correct for defects in vision which is due to errors of refraction in the human eye and thus, at least one of the lens surfaces 14 will be curved to precisely correct for the defect being addressed in a particular individual that wishes to use the lighted reading glasses 5 herein. A variety of lens types may be utilized including concave, convex, plano-convex, cylindrical, compound lenses and/or bi, tri, or tetrofocal lenses, although the reading glasses 5 are preferably adapted for use by those who are farsighted so that convexly configured lenses 12 will typically be employed. Further, although the reading glasses 5 can be provided with prescription lenses 12, from a cost standpoint the lighted glasses 5 are preferred for use with lower cost magnifier lenses 12 that have a well-defined diopter rating. In this regard, the lenses 12 can be offered with nine different diopter ratings from 1.00 up to 3.00 in intervals of 0.25 therebetween. Alternatively, the lenses 12 can be non-refractive for people who do not need vision correction but still want to read in the dark via the lighting provided by the glasses 5 herein.

Figure 9:
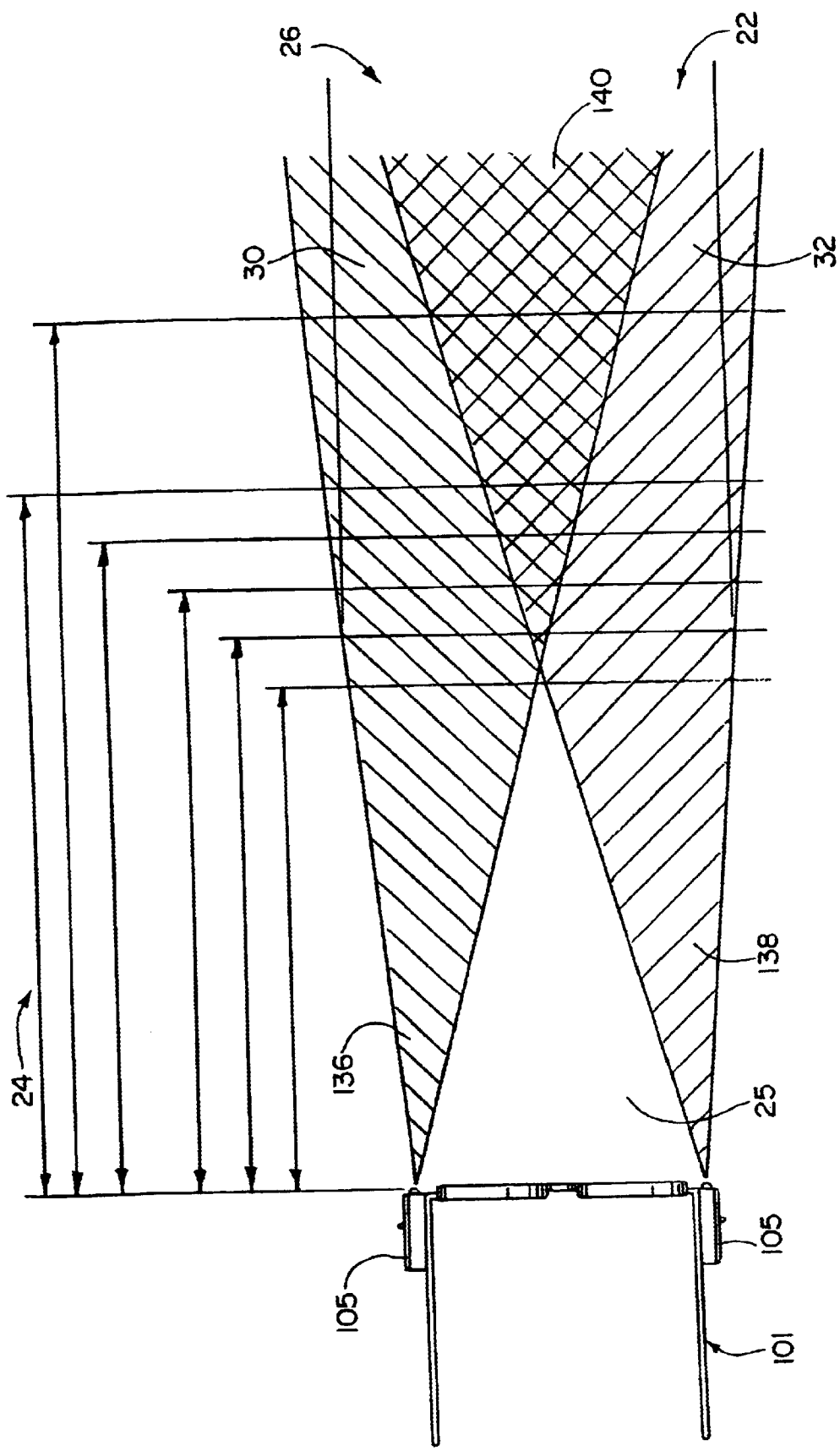
FIG. 9 is a diagramatic view of the lighted glasses showing the respective inwardly directed cones of light produced by each of the light modules and the overlapping lighted area they create in the reading distance range.

With the reading glasses 5 on, the user will be able to read in dark or dimly lit areas via lights 16 that are on the glasses 5 attached by way of respective light mounts 18 therefor. The light mounts 18 fix the predetermined lighted areas 20 to be oriented so that they overlap and create an overlapping lighted area 22 which has double the amount of light and thus significantly increased brightness over that provided by a single one of the lights 16. As best shown in FIG. 9, the overlapping lighted area 22 is disposed in the predetermined reading distance range generally designated 24 by the direction afforded to the lights 16 via their light mounts 18. This range for a normal functioning eye or using an appropriate corrective lens for those requiring vision correction for reading ten or twelve point font with a sufficiently large or wide field of view will be approximately ten to eighteen inches in front of the lenses 12.

Figure 3:
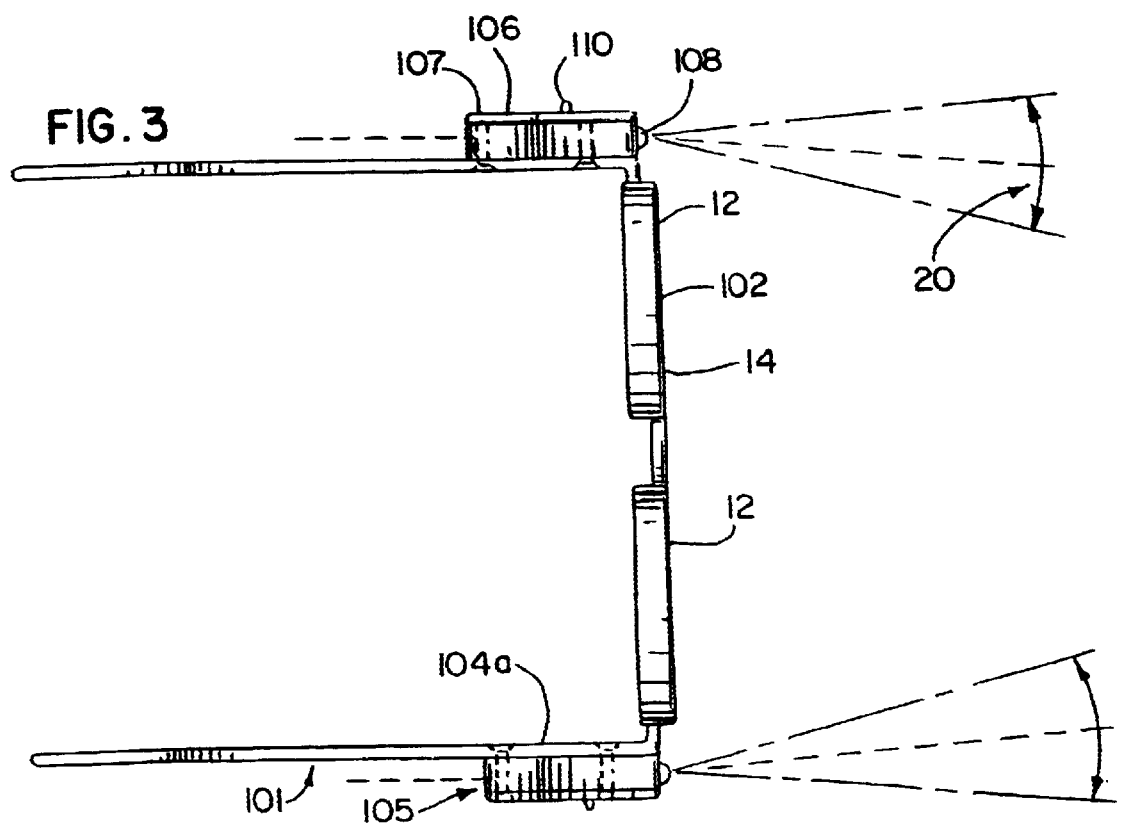
FIG. 3 is a plan view of the glasses of FIG. 2 showing a light switch shifted to activate the lights to generate cones of light emanating therefrom.

The lights 16 are preferably high intensity lights or LEDs 108 that form their lighted areas 20 as narrow light beams in the shape of respective cones 136 and 138 of light directed inwardly toward each other, as shown in FIGS. 3 and 9. In this manner, the point of intersection 48 will be closely adjacent or substantially coincident with the start of the reading distance range 24 and the overlapping area 22 will likewise take on a conical shape 140 and be maximized in size in the range 24. There is also a proximate conical area 25 right in front of the glasses 5 that does not receive light. However, this unlighted area 25 is of little consequence as it substantial falls before the start of the reading distance range 24.

By canting the light beams 136 and 138 inwardly, little light is wasted on areas that are outside the effective field of view, generally designated 26, of the glasses 5. Further, the conical overlap area 140 that receives double the amount of light increases in size with increasing distances from the lenses 12. By contrast, the peripheral areas 30 and 32 on either side of the double-lit overlap area 140 become smaller with increasing distance from the lenses 12. Since light dissipation can become an issue as distances increase from the light source, the increasing size of the double-lit area 22 in comparison to the decreasing size of the single-lit areas 30 and 32 provides a significant advantage in having a very well-lit reading area with an efficient use of the light generated by the LEDs 108 herein. Further, the fixed canting of the beams 136 and 138 allows a user to put on the glasses 5 and know that they will be able to begin reading even in dimly-lit areas by simply turning on the lights 16 without requiring that they be adjusted for focusing them on the material to be read.

The light mounts 18 are preferable compactly sized housings 109 for containing the high intensity LEDs 108 and at least one, and preferably two, small disc-shaped battery power supplies 116 in a space savings manner therein. The housings 109 can be constructed of two halves or cover members 106 and 107 each with mounting surfaces generally designated 30 and 32 configured to orient the LED dome lens 34 in forward opening 36 of the housing 109 such that the light beam cones 136,138 emanate in the desired inward direction. As best seen in FIGS. 7, 8 and 8A, the surfaces 30 and 32 can be formed integrally with their respective housing portions 106 and 107 such as on raised ribs 38 and 40. As shown, the surfaces 30 and 32 are each inclined to extend in the same direction relative to longitudinal axis 42 of the housing 109 such that they extend transversely and at an oblique angle thereto. In this manner, when the housing portions 106 and 107 are attached, the ribs 38 and 40 cooperate to capture the LED dome lens 34 in a canted orientation thereof relative to housing axis 42. Accordingly, with the LEDs 108 switched on, the axis 44 extending centrally through or bisecting the light beam cones 136 and 138 will generally extend parallel to the housing mounting surfaces 30 and 32 and at an oblique angle to the axis 42.

In the preferred and illustrated form, the eyeglasses 5 including temple arms 104 are constructed such that with the arms 104 opened, their forward end portions 104a will extend substantially normal to the general plane of the eyeglass lenses 12 and to any frame portions that may be included thereabout. Further, the housings 109 are constructed so that when attached flush to the arm forward end portion 104a as shown in FIG. 3, the housing axis 42 will extend parallel to the forward end portion 104a and straight forwardly from the glasses 5. With the preferred solid state material for the LEDs 108 as described hererinafter, they will generate a narrow light beam cone 136, 138 of twenty degrees. For this narrow cone 136, 138, the oblique inward cant angle 46 is preferably approximately fifteen degrees so that the point 48 of intersection where the overlap lighted area 22 begins is centrally disposed between the lenses 12 and spaced forwardly therefrom approximately at the start of the reading distance range 24. This inward canting of the light beam cones 136 and 138 also minimizes the amount of light that is projected to lateral areas outside the field of view 26 forwardly of the glasses 5.

The LEDs 108 are preferably high-intensity white LED, such as manufactured by Chicago Miniature Lamp, Inc., of Hackensack, N.J., part number CMD333UWC-ND. Similar types of LEDs are available from a variety of manufacturers and such LEDs would also be acceptable for use in the light module 105. A particular advantage of using the described high-intensity LEDs is the ability of the LEDs to provide large amounts of bright light while consuming significantly less power than incandescent light sources and fiber optic devices. In particular, the LED 108 provides a typical 2300 mcd light output using only 20 mA of power. This allows for significantly extended battery life using inexpensive and lightweight batteries. A further advantage of this type of LED is the relatively narrow viewing angle of approximately 20 degrees. This allows the light output to be directed in a very precise manner, making it ideally suited for use in the present invention. Referring in particular to FIG. 3, it can be seen that the angle of the LED 108 causes the cone of light to be emitted at a specific angle so that the light is directed slightly inward toward the portion being read and thereby avoiding scattering of light outwards and particularly outside the field of view of the glasses 5.

Figure 4:
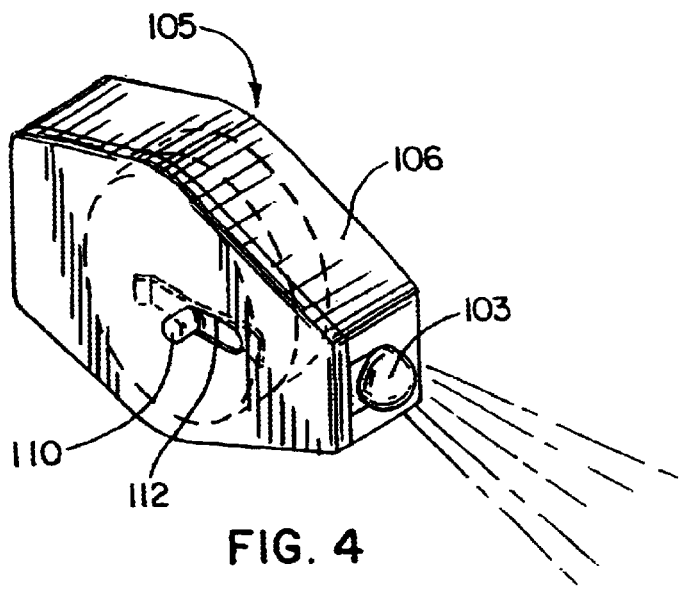
FIG. 4 is a perspective view of the light module showing the compact configuration of a housing of the module with a slot opening for the switch and a forward opening for the light in the form of an LED.

Turning now to FIG. 4, the light module 105 is shown in isolation from the eyeglasses. As can be seen in greater detail, the light module 105 houses a switch 114 having an actuator projecting portion 110. The projecting portion 110 is designed such that a user's thumb or finger can quickly and easily engage the projecting portion 110 to push the switch 114 for sliding in either one of two directions to turn the light module off and on. The elongated slot 112 is sized such that the switch 114 can be moved only a preset distance, thereby enabling the on and off functions to be accomplished with a minimum of motion. When the switch 114 is moved to the "on" position, a set of batteries 116 energize the LED 108. Similarly, when the switch 114 is moved to the "off" position, the connection between the batteries 116 and the LED 108 is broken and the LED 108 is turned off.

Figure 5:
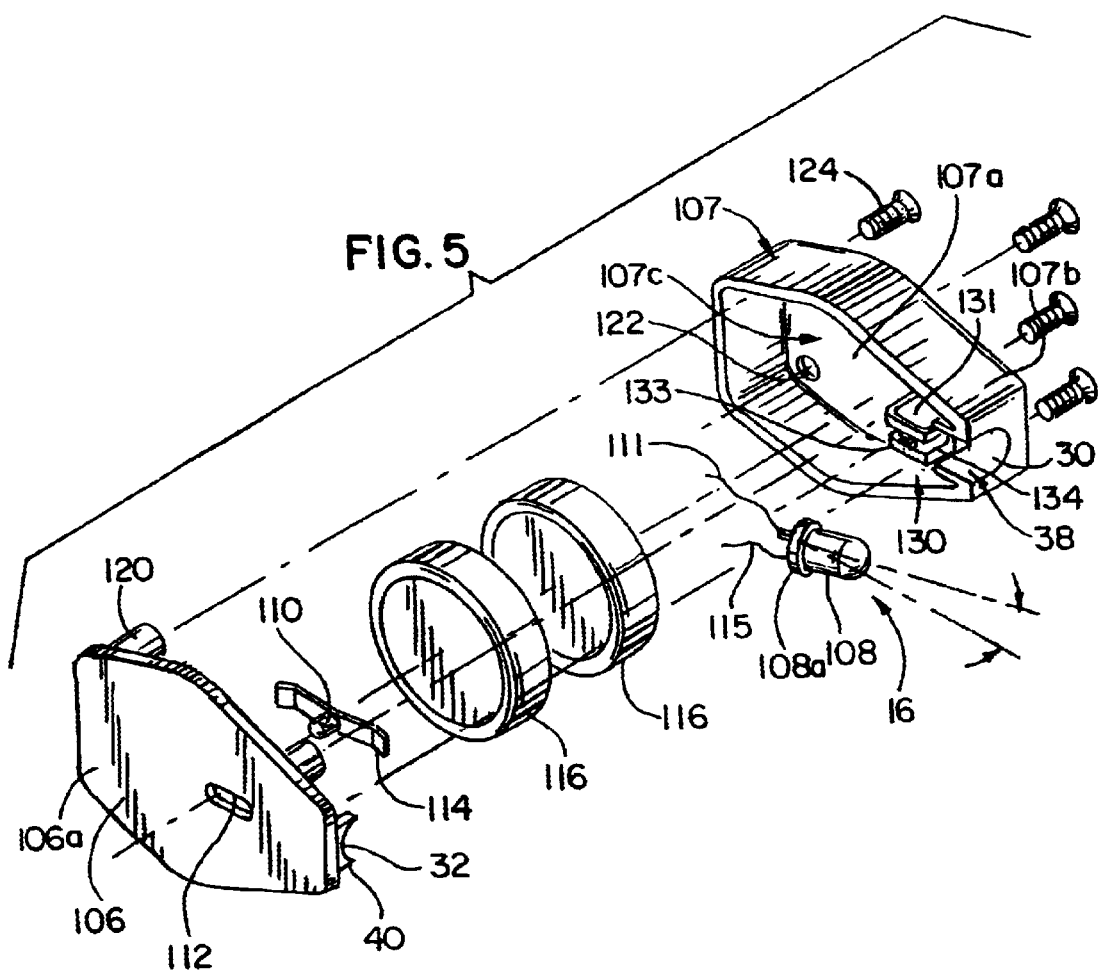
FIG. 5 is an exploded view of the light module of FIG. 4 showing a pair of coin cell batteries used to power the LED.

Referring to FIG. 5, an exploded perspective view of the light module 105 is shown. The light module 105 comprises a housing 109 that is preferably constructed of a lightweight material, such as plastic, to provide the greatest amount of comfort to the wearer, while still being a cost-effective product. The housing 109 includes a first cover member 106 and a second cover member 107. The second cover member 107 is formed with a main flat wall 107a from which upstanding walls 107b extend from the periphery thereof to form an interior space 107c in which the switch 114, the batteries 116 and the LED 108 are disposed. The fastening devices 124, which may be self tapping screws among others, are used to fasten the first cover member 106 as a lid onto the second cover member 107.

The first cover member 106 is formed with an elongated slot 112 cut out of the main flat wall 106a, several integral projecting bosses 120 that can be internally threaded for receiving fastening members or screws 124 and an integral LED positioning member or raised rib 40. The LED positioning member 40 extends toward the cover 107 and has a concave surface 32 that cooperates with curved surface 30 of the cover member 107 for capturing the LED dome lens 35 at the desired angle 46 to axis 42 (FIG. 8a). As described above, the elongated slot 112 is designed to receive the projecting portion 110 of a switch 114 such that the projecting portion 110 extends slightly outside the first cover member 106 and is accessible by a user's finger or thumb. The cover member 106 also is formed having a slot 119 (FIG. 8) to form a housing for the switch 114 when the light module is fully assembled.

The LED 108 includes anode 111 and cathode 115 leads that are used to energize the LED 108. In addition, the anode 111 and cathode 115 leads are physically configured to also enable the LED 108 to be securely held in position within the light module 105. The cathode 115 lead, which is generally the shorter of the two leads, is trimmed further to a size suitable for engaging an aperture 113 in a box shaped member 130. The trimmed cathode 115 lead is bent into a curved hook configuration to behave as a resilient spring clip when mounted into the light module 105; and the anode lead is left in its original form and engages a second aperture in the box shaped member 130, which enables the anode 111 lead to extend into the open portion of the second cover member 107, as further discussed below.

The second cover member 107 includes a LED positioning member or rib 38 having curved surface 30 formed thereon for cooperating with surface 32 to capture the LED dome lens 34, as previously described. A lead guide assembly 130 is disposed within cover member 107. The guide assembly 130 channels or guides the anode 111 lead and the cathode 115 lead into their respective appropriate positions for conducting and switching functions. The guide assembly 130 includes an extending sidewall 131 and an extending support structure 132. The support structure 132 includes first 133 and second 134 indents and a block 135 oriented between the first 133 and second 134 indents. When the LED 108 is placed into position in the guide assembly 130, the anode 111 lead is placed into the channel between the extending sidewall 131 and extending support structure 132. A large portion of the anode 111 lead extends beyond the sidewall 131 and into the cover member 107 opening. The cathode 115 lead, which is in a bent hook configuration is placed into the support structure 132 such that the portion of the cathode that is connected to the LED 108 is situated in the second 134 indent and the hooked portion engages the first 133 indent. The block 135 forces part of the cathode 115 lead to extend beyond the support structure 132 to enable contact between the batteries 116 and the cathode 115 via the switch 114.

The second cover member 107 also includes several apertures 122 for receiving the fastening devices 124. The fastening devices 124 are inserted into apertures 122 and engage the fastening receiving members 120 of cover member 106. The apertures 122 in the second cover member 107 are preferably countersunk such that the heads of the fastening devices 124 sit flush with the surface of the second cover member 107. Furthermore, by providing a standard phillips or slot headed fastening device, a user is able to gain access to the interior of the light module using a simply, commonly found household screwdriver. Once inside, the user self-services the light module 105 and, in particular, replaces the batteries 116 when they are exhausted.

The batteries 116, because of the low power consumption of the high-intensity LEDs 108, may be any commonly found small form factor batteries, such as three volt coin cells manufactured by Panasonic Corporation of Japan, part no. P189D. To this end, the disc-shaped batteries preferably have a diameter of slightly greater than three-fourths of an inch and a width of approximately one-eighth of an inch so that two batteries 116 can be stacked in a compact fashion. Accordingly, with the small LED 108 and the small and thin batteries 116, the housings 109 can be constructed in a very compact fashion. By way of example and not limitation, the main housing walls 106a and 107a have a maximum width of less than approximately one-inch. Since neither the batteries 116 or the LED 108 is particularly long, and the stroke of the switch 110 in minimized as previously described, the length of the housing 109 can be minimized to be on the order of approximately one and one-half inches. Finally, since the batteries 116 are so thin, the depth of the housing 109 can be sized to be slightly greater than the thickness of the two stacked disc batteries 116 or less than approximately one-half inch.

When assembled, the batteries 116 make contact with the anode or elongated portion 111 of the LED 108. The batteries 116 are stacked together such that the negative terminal of the first battery is an electrical contact with the positive terminal of the second battery. The positive terminal of the first battery 116 is then placed in electrical contact with the elongated portion 111 of the LED 18. The switch 114 which is constructed of an electrically conductive lightweight metal strip rests solely on the negative terminal of the second battery when the light module is not producing light, resulting in an open circuit. When the switch 114 is placed in its "on" position, an electrical connection is created between the negative terminal of the battery 116 and the depending hooked portion 115 of the LED 108. Thus the circuit from the positive terminal of the battery 116 to the LED 108 is completed using the switch 114, and the LED 108 illuminates. The projecting portion 110 may be integrally formed as part of the metal strip or may be a plastic or metal projection that is fastened at an appropriate position in the body of the switch 114. The body of the switch 114 is constructed such that the metal strip includes one or more inclines formed by bends in the metal strip of the switch. The inclines are sized to cause the switch 114 to fit relatively tightly between the battery and the housing much like a spring, thereby enabling the switch to maintain its on or off position into which it has been placed.

Referring to FIGS. 8 and 8A, the light module is shown in its assembled form. The LED positioning member 40 of the cover member 106 presses against the body of the LED 108 and pushed the LED 108 into a canted position within the housing 105. A particular advantage in such a configuration is that the LED is able to project light at a precise pre-determined angle. Referring in particular to FIG. 8A, it can be clearly seen that the base 109 of the LED 108 helps to hold the LED 108 in place within the housing 105. Furthermore, it also clearly can be seen that the LED positioning member 40 is angled to a degree such that the top of the LED 108 is pushed against the second cover member 107 and particularly the positioning rib 38 thereof.

Turning now to FIG. 9, the eyeglasses 101 having the light modules 105 mounted thereon are shown in operation. The canted positioning of the LEDs 108 in each of the light modules 105 cooperate to create an overlapping zone 140 of their respective cones of light 136, 138 in the desired reading range. In particular, because of the twenty degree viewing angle of the LEDs 108, and their precise cant within the housing 107, the overlap area 140 occurs within a range of distances that is ideally suited for reading after the use of corrective lenses in the eyeglasses for those in need of vision correction. As a result, the incidence of stray light is reduced and the amount of light illuminating the reading surface is maximized, as previously described. The eyeglasses themselves may be of any configuration. For example, the lenses of the eyeglasses may or may not have frames surrounding the exterior edges of the lenses. Furthermore, the eyeglasses may have bridges for interconnecting the inner portions of the lenses of for interconnecting the inner portions of the lens frames, depending on whether the eyeglasses have frames.

Referring to FIG. 11, the light module 105 is shown with a pair of spring clips 134 attached to the second cover member 107. The spring clips 134 may be manufactured of any strong resilient materials such as a high impact ABS plastic or metal, such as stainless steel. The spring clips may 134 be formed having slight ridges 135 to more securely hold the light modules 105 in place. The spring clips 134 enable the light module 105 to be retrofitted or removably attached to any eyeglasses. Therefore, the present invention is not limited to eyeglasses having premounted light modules that are more perfectly fixed to eyeglasses as by fasteners or the like requiring tools for their removal. Rather, any existing eyeglass frames maybe fitted with the light modules. Referring to FIG. 10, it can be seen that the spring clips 124 are fastened onto the housing 109 using the same apertures 120 and fastening devices 124 as described above. Therefore, a manufacturer of the light module obtains a cost benefit by using the same light module 105 platform, but easily configuring it in a number of different ways, depending on the type and configuration of the lighted eyeglasses.

Figure 12:
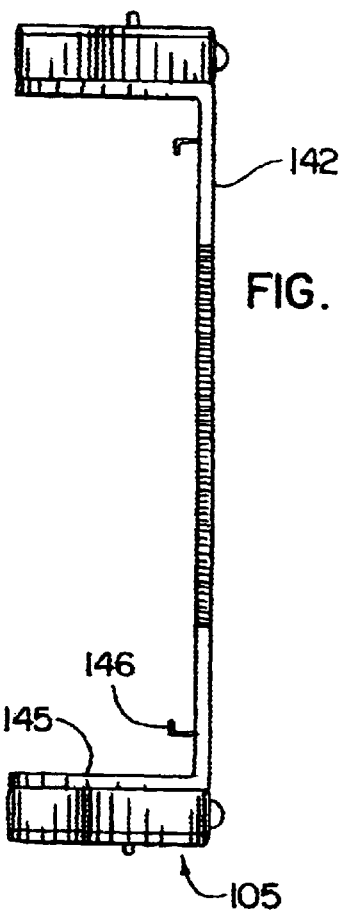
FIG. 12 is a plan view of the light module fixed to a frame to be clipped onto glasses.
Figure 13:
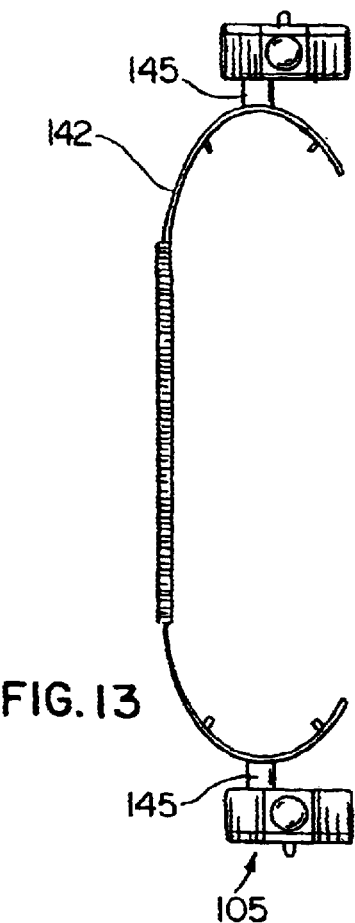
FIG. 13 is a front elevational view of the lighted clip-on frame of FIG. 12.
Figure 14:
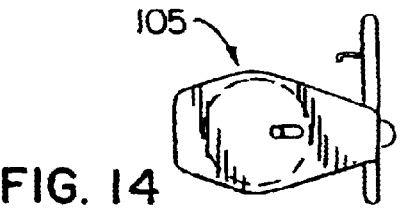
FIG. 14 is a side elevational view of the lighted clip-on frame of FIG. 12.
Figure 15:
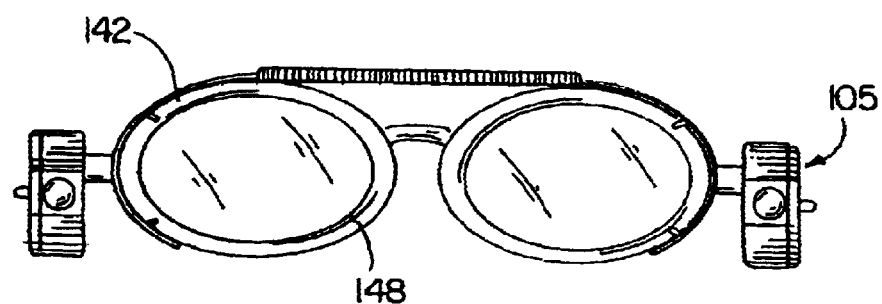
FIG. 15 is a front elevational view of the lighted clip-on frame removable attached to a pair of spectacles.

Turning now to FIGS. 12, 13, 14, and 15, the lighted eyeglasses of the present invention is shown in another aspect. The light module 105 is carried by clip-on glasses 142 having module mounts 145. Referring in particular to FIG. 12, the module mount 145 runs along the length of the light module 105 to provide stability and support to the light module 105. The module mount 145 is attached to the frame at the outer ends of the clip-on glasses and extends rearwardly therefrom. The light modules 105 are mounted on the light mounts 145 such that the respective LEDs 108 project light in a generally forward angled direction. As shown in greater detail in FIG. 13, the module mount 145, although running the entire length of the light module 105, is a relatively narrow strip. This ensures that the device remains light weight and retains its aesthetically pleasing design. As shown in FIG. 14, each of the light modules 105 is attached to a module mount in the temple area of the clip-on glasses 142 and is oriented such that the module mount can not be seen from the side. FIG. 15 shows a representative appearance of the clip-on glasses, having the light modules 105 mounted thereon, attached to a pair of standard eyeglasses 148.

Figure 16:
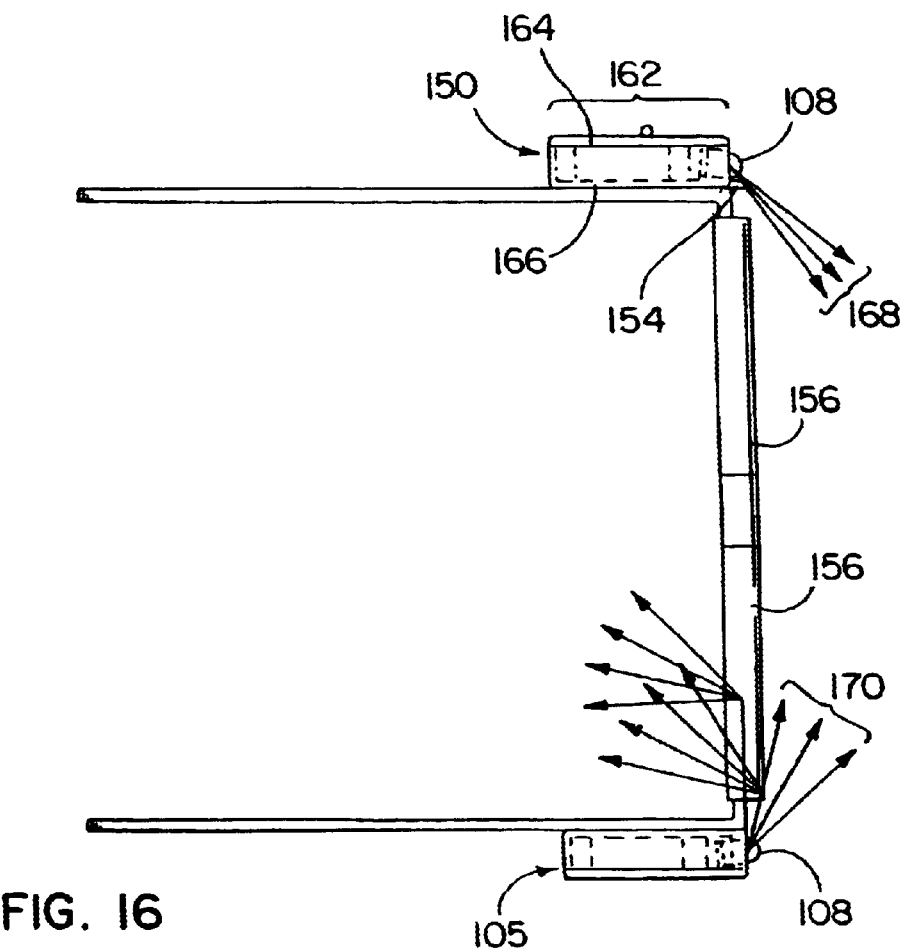
FIG. 16 is a plan view of the lighting modules modified so that each include a blinder extension integral with the extension disposed between the LEDs and the adjacent lenses.
Figure 17:
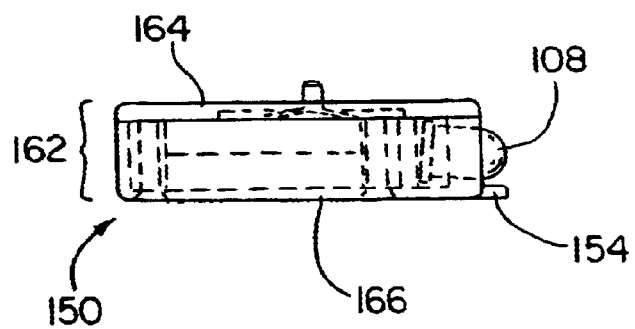
FIG. 17 is an enlarged elevational view of the lighting module of FIG. 16.

Referring now to FIGS. 16 and 17, a light module is shown having an integrally formed blinder extension to eliminate glare. An advantage of such a light module is that reducing glare also reduces eye-fatigue that a wearer may suffer when wearing eyeglasses with the light modules for extended periods of use. Although both types of light modules work equally well, individuals with sensitive eyes may prefer the light module with the blinder extensions. By way of example only, and to illustrate the difference between the two light modules, eyeglasses are shown mounted with a first light module 150 with an integrally formed blinder extension 154 on one temple area of the eyeglasses and a second light module 105 (as generally described above) mounted on the other temple area of the eyeglasses.

Lighted eyeglasses having the light module 105, mounted in the manner described above may, in certain instances, create glare that is perceivable by the wearer. As shown, stray or incident light rays 170 that are emitted by the LED 108 may project towards the lens 156 of the pair of eyeglasses 158. The rays 170 are then reflected or refracted by the lenses 156 into the eyes of the wearer. In contrast, the glare reducing light module 152 includes an integral projecting portion or blinder extension 154 for reducing potential glare that may be generated as a result of the light 160 emitted by the LED 108 as it is reflected or refracted off the lenses 156 in the glasses 158. The light module 150 is comprised of a housing 162 that includes a first cover member 164 and a second cover member 166. The second cover member 166 includes the blinder extension 154, which is situated between the LED dome and the lens 156 when the light module is mounted to eyeglasses. The blinder extension 154 is configured such that it extends outwards in the direction of the LED 108 and is optimally sized such that the blinder extension 154 blocks the incident rays of light without distracting the wearer or interfering with the light projected for illuminating a reading surface.

While there have been illustrated and described particular embodiments of the present invention, it will be appreciated that numerous changes and modifications will occur to those skilled in the art, and it is intended in the appended claims to cover all those changes and modifications that fall within the true sprit and scope of the present invention.

What is claimed is:

1. Lighted reading glasses that provide enhanced viewing of text of a predetermined conventional size in a predetermined distance range from the glasses in poorly lit areas, the lighted reading glasses comprising:

a pair of lenses having outer portions and inner portions that are adjacent to and laterally spaced from each other and providing a predetermined field of view for a user;

light transmissive material of the lenses having a predetermined configuration for refracting light to provide the user with vision correction of a predetermined character to allow the predetermined size of text disposed in the predetermined distance range within the field of view to be substantially clearly read;

a pair of lights associated with the lenses each having a predetermined high light strength rating and a predetermined lighted area in which light emanating therefrom is projected;

a pair of light mounts adjacent the outer portions of the lenses that cooperate with the lights to fix the predetermined lighted areas relative to the lenses to be oriented for overlap to provide an overlapping lighted area that is maximized in size in the predetermined distance range; and support surfaces of the light mounts having a predetermined configuration which capture the lights in a predetermined orientation to be fixed against movement in any direction such that the predetermined lighted areas emanating therefrom are directed inwardly toward each other to avoid the need to adjust the lights for maximizing the size of the overlapping lighted area in the field of view at the predetermined distance range.

2. The lighted reading glasses of claim 1 wherein the light mounts are housings that include the support surfaces.

3. The lighted reading glasses of claim 1 wherein the predetermined lighted areas each have a conical shape with the conical areas intersecting at a predetermined distance within the predetermined distance range so that the overlapping lighted area increases in size with increasing distance from the lenses to minimize effects of light dissipation in the predetermined distance range.

4. The lighted reading glasses of claim 1 wherein the lights are high intensity light-emitting diodes of a predetermined material so that the predetermined lighted area is generated by a narrow light beam.

5. The lighted reading glasses of claim 1 wherein the predetermined lighted areas are narrow cones so that there is an unlighted area proximate to the lenses which does not substantially fall within the predetermined distance range.

6. The lighted reading glasses of claim 1 wherein the light mounts are housings, the lights are light emitting diodes of a predetermined material, and at least one small disc-shaped battery power supply for the light-emitting diodes to allow the housings to be compactly sized with each of the light-emitting diodes and the battery power supply therefor self-contained in respective ones of the housings.

7. The lighted reading glasses of claim 1 wherein the light mounts are housings, and a small power source in the housings for each of the lights to allow the housings to be compactly-sized, self-contained lighting modules for the glasses.

8. The lighted reading glasses of claim 7 including a frame, and the lighting modules are one of removably carried on the frame and fixed to the frame.

9. The lighted reading glasses of claim 8 wherein the removably carried modules include resilient clips for being removably attached to the frame.

10. The lighted reading glasses of claim 8 wherein the removably carried light modules are fixed onto an adjustable light-carrying frame configured for being releasably secured to the frame of the reading glasses.

11. The lighted reading glasses of claim 8 wherein the frames include lens portions that extend about the light transmissive material of the lenses and an interconnecting bridge portion that extends between the frame lens portions.

12. The lighted reading glasses of claim 1 including elongate temple arms having forward and rearward ends with the arms extending rearwardly from adjacent the outer portions of the lenses with the light mounts being fixed to the temple arms adjacent the forward ends thereof.

13. The lighted reading glasses of claim 12 wherein the light mounts include blinder extensions that project between the lights and the lenses to minimize refraction or reflection of light emanating from the lights through the lenses.

14. The lighted reading glasses of claim 1 wherein the lenses have a convex configuration with a predetermined diopter rating to magnify the text to be read.

15. The lighted reading glasses of claim 1 wherein the predetermined high light strength rating of the lights is approximately 2300 milli candles (mcd) to generate high brightness light so that light dissipation is minimized at distances in the predetermined reading distance range where the overlapping lighted area is absent.

16. The lighted reading glasses of claim 1 wherein the predetermined lighted areas are cones of light increasing in size further from the glasses so that the overlapping lighted area has a conical shape leaving only peripheral areas in the field of view of the lenses that are lit by a single one of the lights with the peripheral areas becoming progressively smaller as distances from the lenses increase.

* * * * *